July 13, 1943.   J. C. SCHELLIN ET AL   2,324,030
HOSE COUPLING ATTACHING APPARATUS
Filed June 21, 1941   2 Sheets-Sheet 2
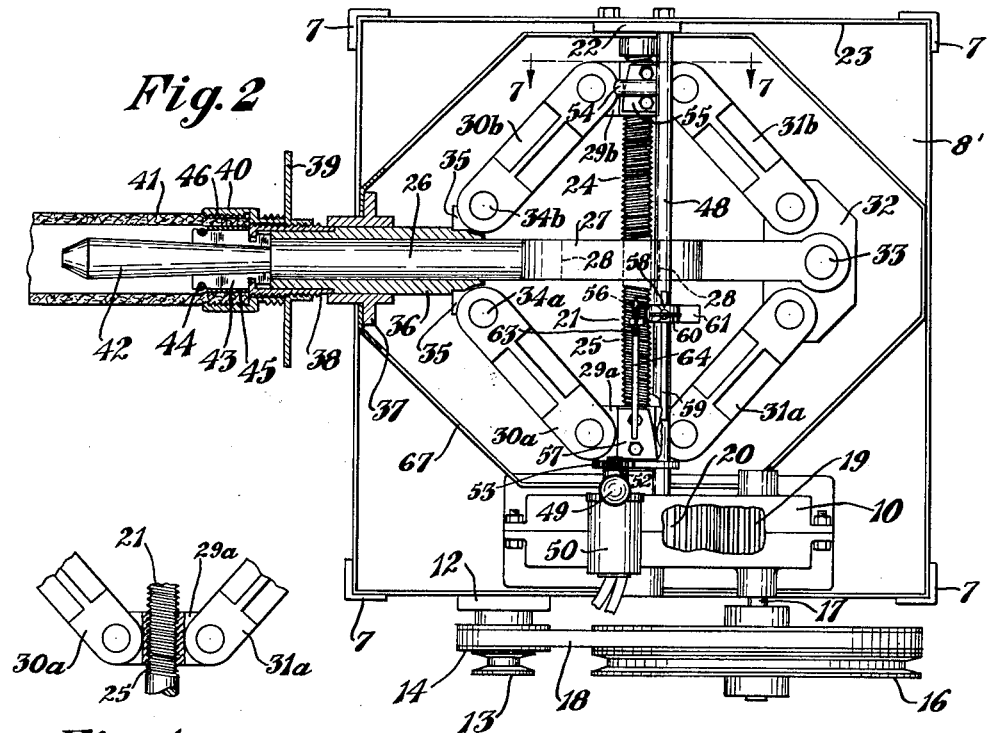
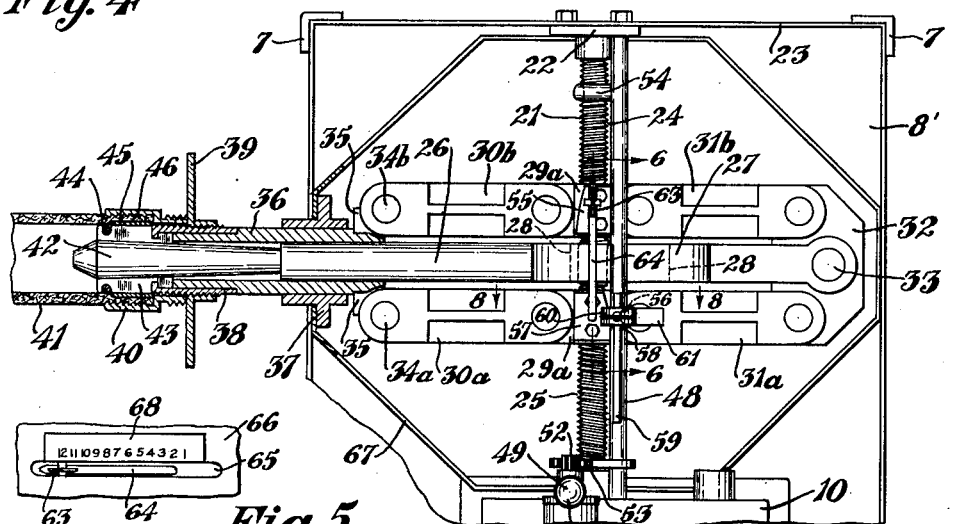
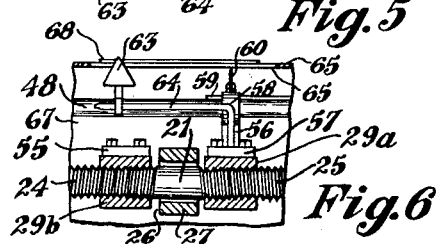
Inventors
John C. Schellin,
Rutherford H. Hunter,
Earl J. Housekeeper
and Florian Vern Calhoun
By Flash and Bishop Attorneys Patented July 13, 1943

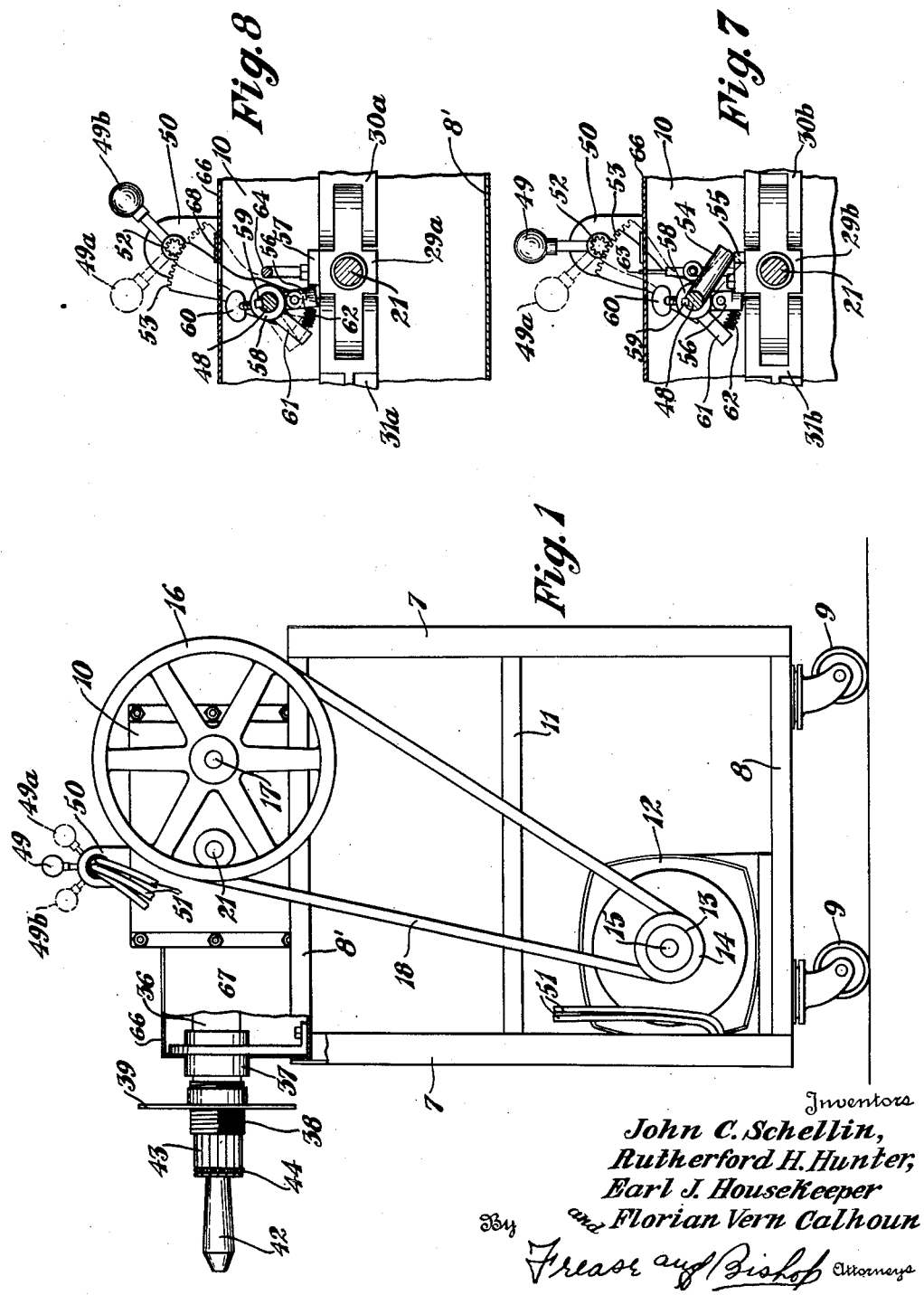

2,324,030

UNITED STATES PATENT OFFICE 2,324,030

HOSE COUPLING ATTACHING APPARATUS

John C. Schellin, Rutherford H. Hunter, and Earl J. Housekeeper, Wooster, and Florian Vern Calhoun, Millersburg, Ohio, assignors to The Wooster Brass Company, Wooster, Ohio, a corporation of Ohio Application June 21, 1941, Serial No. 399,146

6 Claims. (Cl. 74—38)

This invention relates generally to apparatus for radially expanding tubular members, and more particularly to improved apparatus for attaching coupling members to fire hose by expanding the end of the hose into tight engagement with a coupling member.

Practically all fire hose couplings in common use are attached to the ends of hose lengths by radially expanding a thin metal ring or tube within the end of the hose to force the hose outwardly against the interior of a coupling member, and the coupling member is preferably tapered or serrated or both, so as to grip and hold the hose.

Accordingly, when the coupling members are attached to the hose ends, whether the couplings are new or old, it is necessary to provide apparatus for exerting relatively great radial pressures on the expansion rings to grip and hold the hose in the coupling members.

Prior hand operated expanders for attaching hose couplings have been provided but the expanding pressure exerted by these tools is limited by the amount of manual effort which can be applied, and accordingly such tools are not satisfactory, especially for the larger sizes of fire hose in common use, such as 2½" diameter and larger.

For attaching couplings to standard fire hose of rubber and fabric composition, hydraulic expanding equipment has been used to some extent, but such equipment requires conveniently available hydraulic pressure lines, or if the equipment is self-contained it involves a large number of parts, including for example an electric motor, a motor driven pump, an oil reservoir, a working piston and cylinder, and various control valves and piping.

It is therefore an object of the present invention to provide a novel self-contained apparatus for attaching couplings to hose.

Another object is to provide novel hose coupling attaching apparatus having a reduced number of parts, yet capable of attaching couplings to rubber and fabric fire hose of relatively large sizes.

A further object is to provide improved hose coupling attaching apparatus having novel mechanical means for exerting relatively high radial expanding pressures.

Another object is to provide improved hose coupling attaching apparatus having novel automatic means controlling the operation of the expanding mechanism.

A still further object is to provide a novel self-contained apparatus for attaching fire hose couplings, which apparatus is extremely compact and light in weight, and inexpensive to construct and operate.

These and other objects which will be apparent from the following description are accomplished by the present invention, which may be briefly stated as including a toggle-linkage producing relative axial movement between expansible means and an expanding member therefor, said toggle linkage being actuated by a screw operated by an electric motor and having means automatically tripping the motor switch for controlling the operation of the expansible means.

Referring to the drawings forming part hereof,

Figure 1 is an elevational view of the improved hose coupling attaching apparatus partly in section;

Fig. 2 is an enlarged plan view thereof with parts in section and the cover removed, showing a coupling member in position to be attached to a hose and the toggle linkages in folded position;

Fig. 3 is a similar view showing the toggle linkages in extended position for attaching the coupling member;

Fig. 4 is a fragmentary sectional view of a central portion of one of the toggle linkages, showing the power driven screw threaded therein;

Fig. 5 is a fragmentary plan view of the cover plate showing the indicator for use in setting the expanding mechanism for various sizes and types of hose;

Fig. 6 is a fragmentary sectional view at the indicator as at line 6—6, Fig. 3;

Fig. 7 is a fragmentary transverse sectional view as on line 7—7, Fig. 2; and

Fig. 8 is a fragmentary transverse sectional view as on line 8—8, Fig. 3.

Similar numerals refer to similar parts throughout the drawings.

Referring to Fig. 1, the improved self-contained hose coupling attaching apparatus includes a rectangular frame having four upright angles 7 at the corners thereof and secured as by welding to a base member or pan 8. The base member 8 is preferably rollably mounted as shown upon suitable casters 9 for facilitating moving the apparatus from place to place. A top platform or pan 8' is welded to the tops of the upright angles 7 and forms a support for the gear case 10 and the mechanism for attaching hose coupling members to the ends of hose.

As shown a shelf 11 may be secured within the corner upright angles 7 between the base member 8 and the top platform 8', and the shelf 11 strengthens the frame and may be used for storing extra parts of the mechanism.

The power drive means preferably includes a motor 12 supported on a base member 8, and the motor 12 is preferably a one horse power reversible motor operable by connection with a 110 volt line and having two different sized pulleys 13 and 14 on the end of its shaft 15.

A driven pulley 16 is secured on a pulley shaft 17 which is journaled in the gear case 10, and a belt 18 operatively connects the motor 12 with the driven pulley 16, the pulley 16 being a double pulley as shown, so that each groove thereof is aligned with one of the pulleys 13 and 14. Within the gear case 10 a pinion gear 19 is keyed on the shaft 17 and meshes with a large gear 20 keyed on the screw shaft 21 which is journaled at one end in the gear case and at the other end in a bearing bracket 22 secured to the rear flange 23 of the top platform 8' at the side thereof opposite to the gear case.

Accordingly, the motor 12 drives the pulley 16 which in turn drives the screw shaft 21 through preferably about a five to one reduction between gears 19 and 20.

The screw shaft 21 is provided throughout substantially half its length with a right hand screw thread as indicated at 24, and the other half substantially of its length is provided with a left hand screw thread as indicated at 25.

A draw bar 26 extends transversely of the screw shaft 21 midway between the ends thereof, and the draw bar is provided with a slotted portion 27 which straddles the screw shaft 21 and permits transverse movement of the draw bar with respect to the screw shaft, the ends of the slot in the draw bar being shown in dotted lines at 28.

A toggle linkage is provided on each side of the draw bar 26, and each toggle linkage includes a short central link through which the screw shaft 21 is threaded, and two longer links pivoted to opposite ends of the central link. The short central link at the gear case side of the draw bar is indicated at 29a and the longer links pivoted thereto at 30a and 31a, and the central link of the other linkage is indicated at 29b and the longer links pivoted thereto at 30b and 31b. The other ends of links 31a and 31b are pivotally connected to a crosshead member 32 to which the end of the draw bar is preferably pivotally connected as at 33.

The other ends of links 30a and 30b are pivotally connected as at 34a and 34b to ears 35 provided on a bearing sleeve 36 in which the draw bar 26 is slidably journaled. The bearing sleeve 36 is in turn slidably journaled in a bearing bracket 37 which is secured to and supported on the top platform 8', as shown in Fig. 1.

The outer end of the bearing sleeve 36 has secured thereon an externally threaded collar 38 on which is screwed a gauge or stop plate 39 forming an adjustable stop against which the coupling member to be attached is abutted. As shown in Figs. 2 and 3 a male coupling member 40 is being attached to the end of the hose length 41 and its threaded end is in abutment with the stop plate 39.

The end portion of the draw bar 26 is longitudinally tapered as shown at 42 to provide an expanding member longitudinally slidable within a circular series of radially expansible fingers 43, so that relative movement of the tapered portion 42 will cause the fingers 43 to expand radially. The fingers 43 are of usual construction and a circular spring 44 is provided around the fingers 43 for yieldably holding them in closed position.

As shown in Fig. 2 when the tapered portion 42 of the draw bar projects from the expansible fingers 43 so that they are in collapsed position, the hose 41 with its coupling member 40 positioned over the end thereof, and with an expansion ring 45 positioned within the hose end, may be telescoped over the expansible fingers 43 in position to have the expansion ring expanded outwardly and compress the end of the hose. As shown in Fig. 3 when the draw bar is moved within the expansible fingers to expand the same radially outward, the fingers force the expansion ring 45 radially outward and compress the end of the hose between the expansion ring and the serrated portion 46 of the coupling member 40.

The detailed construction of the expansible fingers 43 and the radial expansion thereof by the longitudinal movement of the tapered portion 42 of the draw bar is more or less usual and per se forms no part of the present invention.

When the motor is operated to drive the screw shaft 21 in a counterclockwise direction as viewed in Figs. 7 and 8, the threaded engagement of the screw shaft 21 with the central links 29a and 29b will cause the linkages to move toward their extended position shown in Fig. 3. During the movement of the linkages from the folded position of Fig. 2 to the extended position of Fig. 3, the bearing sleeve 36 together with collar 38 and stop plate 39 will be moved toward the left by reason of the connection between links 30a and 30b with the end of the bearing sleeve 36. At the same time the draw bar 26 will be moved to the right by reason of the connection between links 31a and 31b with the crosshead 32 attached to the draw bar. As a result, when the position of Fig. 3 is reached the expansible fingers 43 will be fully expanded to apply maximum expanding pressure to force the expansion ring outwardly.

When it is desired to remove the hose and coupling member from the expansible fingers, the motor is reversed to drive the screw shaft 21 in a clockwise direction as viewed in Figs. 7 and 8 which moves the linkages to the folded position of Fig. 2 and collapses the fingers 43 so that the hose 41 with its coupling member attached may be removed.

Means for limiting the folding and extending movement of the linkages so that the motor will be automatically stopped when the linkages reach the positions of either Fig. 2 and Fig. 3, preferably includes a control shaft 48 for actuating the handle lever 49 of a toggle switch indicated at 50 for operating the motor 12 in opposite directions. The switch 50 is electrically connected to the motor 12 by means of wires 51, in a usual fashion.

As shown in the drawings, when the handle lever 49 is in a vertical position the motor is cut off. When the handle is thrown to the left to the dot-dash position 49a in Fig. 7, the motor drives the shaft in a counterclockwise direction to move the toggle linkages toward extended position and the handle lever 49 is operatively connected by means of a pinion 52 meshing with a gear segment 53 on the control shaft 48, so that rotation of the hand lever 49 will rotate the control shaft.

As shown in Fig. 7 the control shaft has a depending finger 54 which is adapted to engage the curved edge of a cam plate 55 secured on top of the central link member 29b, when the linkages reach their extreme folded position of Fig. 2, and the engagement of the finger 54 with the cam plate 55 rotates the control shaft 48 sufficiently to throw the switch back to the neutral or vertical position. In Fig. 7 the dot-dash position of the finger 54 and segment 53 corresponds to the position 49a of the hand lever and represents the position of these parts just prior to the engagement of finger 54 with the cam 55.

The control shaft 48 is provided with another depending finger 56 which is adapted to engage a cam plate 57 secured on top of the central rear member 29a cutting off the motor when the linkages are being extended and reach the position at which the particular size and type of hose being used is fully expanded. In Fig. 8 the full-line position 49b of the lever, segment 53 and finger 56 represents their position just prior to the engagement of the finger 56 with the cam 57.

The finger 56 is pivoted to a collar 58 non-rotatably slidable on the control shaft 48 by means of a keyway fitting the key 59 thereon and having a thumb screw 60 for securing the collar in adjusted position along the shaft 48. A rigid spring abutment arm 61 extends from collar 58 in angular relation to finger 56 and a coil spring 62 is interposed between finger 56 and arm 61 to yieldingly resist movement of finger 56 toward arm 61. This arrangement constitutes means for automatically reversing the travel of the toggle linkages when a desired extended position is reached.

Thus when the finger 56 in the full-line position of Fig. 8 engages the cam 57, the finger 56 pivots to the left compressing the spring 62. The reaction of the spring throws the abutment arm to the dot-dash position and rotates the shaft 48 and segment 53, throwing the handle switch lever past the neutral position to the dot-dash position 49a and automatically reversing the motor and the travel of the toggle linkages.

Indicating means showing the positions at which various types and sizes of hose are fully expanded for attaching couplings includes a pointer 63 mounted on a rod 64 secured to cam 57, the pointer being arranged to travel in a slot 65 in the cover plate 66 of a housing 67 for the toggle linkages and screw. A plate 68 is mounted on the cover plate adjacent to the slot 65 and has numbers thereon to which the pointer 63 is directed.

Accordingly, in operating the improved hose coupling attaching apparatus, if the operator ascertains that a certain size and type of hose is fully expanded for attaching a coupling thereto when the pointer 63 is for example at the number 7 on indicator plate 68, he then sets or adjusts the collar 58 on the shaft 48 to engage cam 57 and reverse the motor at that position. Thereafter in attaching all couplings to that particular size and type of hose, the operator merely positions the hose, expansion ring and coupling on the expanding fingers 43 and throws the handle switch lever to the position 49b. The toggle linkages will then travel toward extended position until the pointer reaches number 7 at which predetermined position the travel is automatically reversed until finger 54 cuts off the motor, at which time the hose coupling is ready for removal.

Meanwhile, the operator has had time to assemble another hose length, coupling and expansion ring in readiness for positioning on the expanding fingers, so that no time is lost between attaching operations.

Moreover, there is no danger of over expansion of the hose or coupling, and no danger of damaging parts of the mechanism by failure to stop the motor at the proper time.

The improved apparatus provides an inexpensive self-contained portable unit with a minimum number of parts, operable by connection with any standard 110 volt source of electric power, adapted for attaching coupling members to fire hose of relatively large sizes and having novel automatic means for controlling operation of the attaching mechanism.

We claim:

1. Power mechanism for producing relative movement between two axially aligned movable members, including a toggle linkage connected at one end to one of said members and at the other end to the other member for producing axial movement of both members in opposite directions, means for actuating said toggle linkage, and means on said toggle linkage for controlling the operation of said actuating means.

2. Power mechanism for producing relative movement between two members, including a toggle linkage connected to said members for producing relative axial movement therebetween, screw means for actuating said toggle linkage, power means for driving said screw means, control means for the power means, and cam means on said toggle linkage for engaging the control means to limit the relative axial movement of said members in both directions.

3. Power mechanism for producing relative movement between two axially aligned movable members, including a toggle linkage connected at one end to one of said members and at the other end to the other of said members, screw means extending transversely across one of said members for opening and closing said toggle linkage for producing relative axial movement between said members, power means for driving the screw means, a rotary control shaft for the power means, and means on said linkage for engaging and rotating the control shaft to automatically control said screw means for limiting the opening and closing movement of said toggle linkage.

4. Power mechanism for producing relative movement between two telescoping members, including a toggle linkage connected at one end to one of said members and at the other end to the other of said members, and power driven screw means extending transversely across one of said members for opening and closing said toggle linkage for producing relative axial movement between said members.

5. Power mechanism for actuating two relatively movable members, including toggle linkages on opposite sides of said members and operatively connected thereto for relatively moving the same, screw means for simultaneously actuating said toggle linkages, power means for driving said screw means, control means operatively connected to said power means, and cam means on said toggle linkages adapted to engage said control means for automatically controlling operation of said screw means.

6. Power mechanism for actuating two relatively movable members, including a toggle linkage operatively connected to said members for relatively moving the same in opposite directions, screw means for actuating the toggle linkage, a reversible power drive for said screw means, a rotatable control shaft for the power drive extending parallel to said screw means, and a finger adjustably mounted on said shaft and adapted to be operatively engaged and rotated by said toggle linkage for reversing said power drive at a predetermined position of said toggle linkage.

JOHN C. SCHELLIN.
RUTHERFORD H. HUNTER.
EARL J. HOUSEKEEPER.
FLORIAN VERN CALHOUN.